(12) United States Patent
Passero et al.

(10) Patent No.: US 10,618,554 B2
(45) Date of Patent: Apr. 14, 2020

(54) STEERING ASSEMBLY WITH INTEGRATED SENSOR

(71) Applicant: Dana Heavy Vehicle Systems Group, LLC, Maumee, OH (US)

(72) Inventors: Anthony N. Passero, Perrysburg, OH (US); Stoyan I. Stoychev, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 249 days.

(21) Appl. No.: 15/683,014

(22) Filed: Aug. 22, 2017

(65) Prior Publication Data

US 2018/0057051 A1 Mar. 1, 2018

Related U.S. Application Data

(60) Provisional application No. 62/378,920, filed on Aug. 24, 2016.

(51) Int. Cl.
*B62D 7/18* (2006.01)
*B62D 15/02* (2006.01)

(52) U.S. Cl.
CPC ............ *B62D 15/023* (2013.01); *B62D 7/18* (2013.01); *B60G 2204/11* (2013.01); *B60G 2400/05142* (2013.01); *B60G 2400/05144* (2013.01)

(58) Field of Classification Search
CPC .... B62D 15/023; B62D 7/18; B60G 2204/11; B60G 2400/05142; B60G 2400/05144
USPC ...................................................... 280/93.5
See application file for complete search history.

(56) References Cited

U.S. PATENT DOCUMENTS

| 5,760,938 A | * | 6/1998 | Hodge | ................... G01B 11/00 33/288 |
| 6,208,240 B1 | | 3/2001 | Ledesma | |
| 6,490,800 B1 | * | 12/2002 | Skagerlund | ........ G01B 11/2755 33/203 |
| 6,494,471 B2 | | 12/2002 | Lukac | |
| 6,568,696 B2 | | 5/2003 | Osborn et al. | |
| 7,097,184 B2 | | 8/2006 | Kapaan et al. | |
| 7,296,810 B2 | | 11/2007 | Thannikary et al. | |

(Continued)

FOREIGN PATENT DOCUMENTS

DE 102004053743 A1 5/2006
JP H10311738 A 11/1998
(Continued)

OTHER PUBLICATIONS

European Patent Office, International Search Report with Written Opinion issued in Application EP17187692.3, dated Dec. 12, 2017, 8 pages, European Patent Office, Hague, Netherlands.

*Primary Examiner* — Ruth Ilan
*Assistant Examiner* — Hilary L Johns
(74) *Attorney, Agent, or Firm* — Marshall & Melhorn, LLC

(57) ABSTRACT

A wheel-end assembly for a vehicle enabling the direct measurement of the wheel-end position. The wheel-end assembly includes a knuckle having a kingpin bore and a kingpin disposed within the kingpin bore. The knuckle is at least partially rotatable about a longitudinal axis of the kingpin. A knuckle cap assembly is coupled with the kingpin bore adjacent to an end of the kingpin. In addition, a sensor is coupled with the knuckle cap assembly which measures a position of the kingpin relative to the sensor.

20 Claims, 10 Drawing Sheets

(56) References Cited

U.S. PATENT DOCUMENTS

| | | |
|---|---|---|
| 7,347,433 B2 | 3/2008 | Pressler et al. |
| 7,413,201 B2 | 8/2008 | Freytag et al. |
| 7,543,831 B2 | 6/2009 | Pope et al. |
| 2011/0035113 A1* | 2/2011 | Yanagi .................. B60G 7/006 701/42 |

FOREIGN PATENT DOCUMENTS

| | | | |
|---|---|---|---|
| WO | 2010055370 A1 | 5/2010 | |
| WO | WO-2010055370 A1 * | 5/2010 | ........... B62D 15/023 |
| WO | 2016116150 A1 | 7/2016 | |

* cited by examiner

STEERING ASSEMBLY WITH INTEGRATED SENSOR

RELATED APPLICATIONS

The present application claims the benefit to U.S. Provisional Application No. 62/378,920 filed on Aug. 24, 2016, which is incorporated herein by reference in its entirety.

BACKGROUND

The present disclosure relates to a vehicle steering system; particularly to a steering system wheel-end assembly with an integrated turn angle sensor.

In a conventional steering system steering gears control vehicle direction by providing a desired wheel turn angle through a series of linkages on a steer axle. Conventional steering systems may include a steering column mechanically connected to the steering gear; the steering gear may operate a pitman arm connected to a drag link transverse to an axle beam; and the drag link may be connected to a steering arm connected to a first steering knuckle on which a wheel is mounted. Conventional steering systems may also include a tie rod connecting the first steering knuckle with a second steering knuckle. Hydraulic and/or electric actuators may also be included in a conventional steering system.

While in service, the steering system components may become misaligned or unfit for continued service, requiring maintenance to align and/or replace components. The disclosure herein describes a steering system that allows direct measurement of the turn angle and toe angle at each wheel in the steering system during vehicle operation and during vehicle maintenance. The measurements may, inter alia, be utilized to identify steering system component misalignment and wear, and to set the turn angle and the toe angle.

SUMMARY

The present subject matter disclosed herein provides for a wheel-end assembly for a vehicle having an integrated angular position sensor that enables the direct measurement of the wheel-end rotational and axial positions. The wheel-end assembly includes a knuckle having a kingpin bore and a kingpin disposed within the kingpin bore. The knuckle is at least partially rotatable about a longitudinal axis of the kingpin. A knuckle cap assembly is coupled with the kingpin bore adjacent to an end of the kingpin. In addition, a sensor is coupled with the knuckle cap assembly which measures a position of the kingpin relative to the sensor.

In one embodiment of the present subject matter, a magnet is coupled with an end of the kingpin adjacent to the sensor.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure and do not illustrate all possible implementations thereof. The drawings are not intended to limit the scope of the present disclosure in any way.

DETAILED DESCRIPTION

Figure 1:
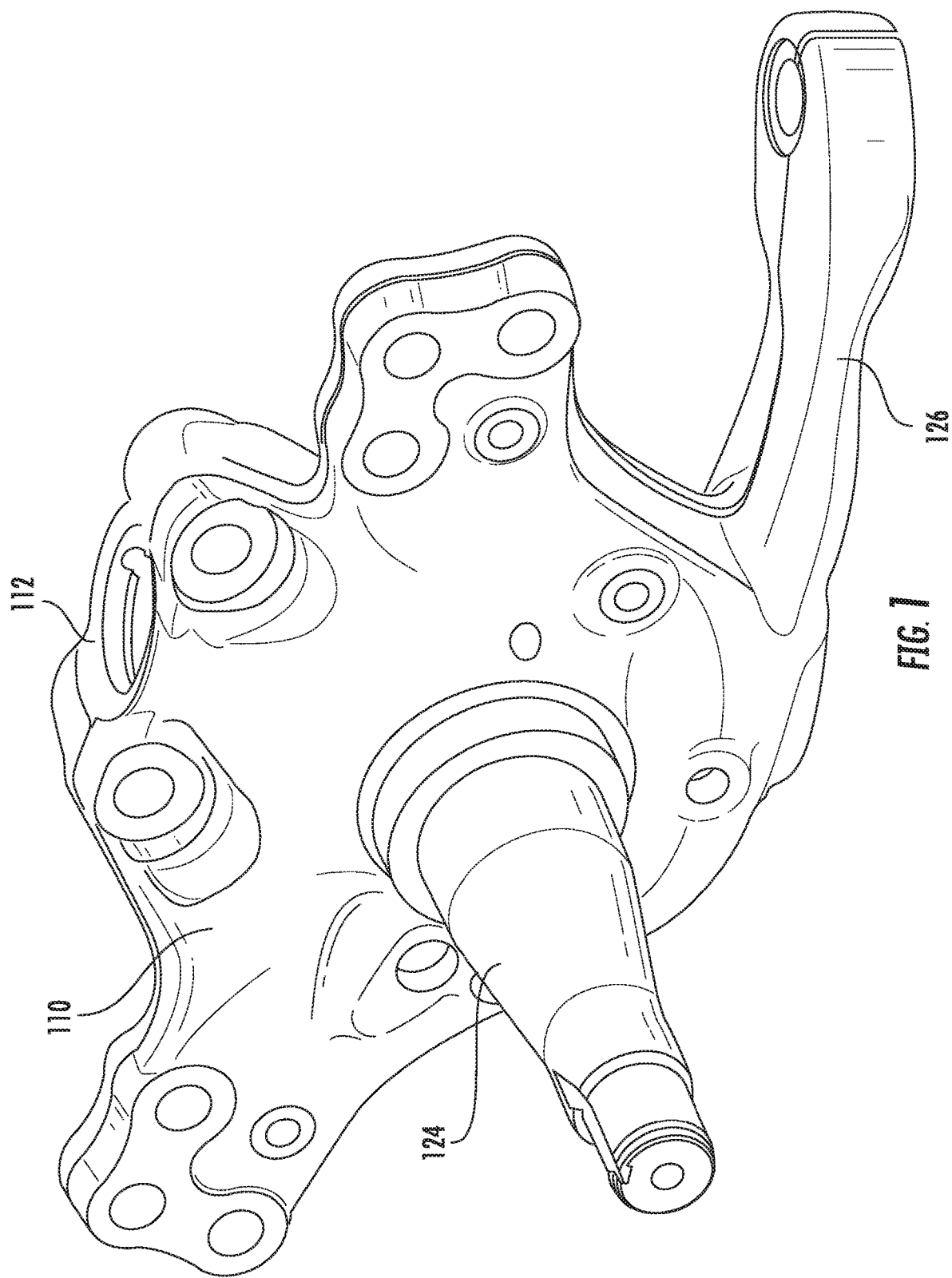
FIG. 1 illustrates a perspective view of a knuckle 110 according to an embodiment of the presently disclosed subject matter.

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

It will be recognized by persons having skill in the relevant arts that terms of spatial orientation such as "upper" and "lower" are utilized herein to disclose the relation of features of the presently disclosed subject matter to one another, and that dependent on the disposition of components in certain embodiments "upper" features may become "lower" features and vice versa, and "upper" and "lower" features may become "left" and "right" features and vice versa.

Certain embodiments of the present subject matter comprise a vehicle steering system wheel-end assembly 100 utilized with heavy vehicles such as commercial trucks. The vehicle steering system wheel-end assembly 100 disclosed herein may also be utilized with, but is not limited to use with, military vehicles, off-highway vehicles, passenger vehicles, electric vehicles, and autonomous or semi-autonomous driving vehicles.

Figure 2:
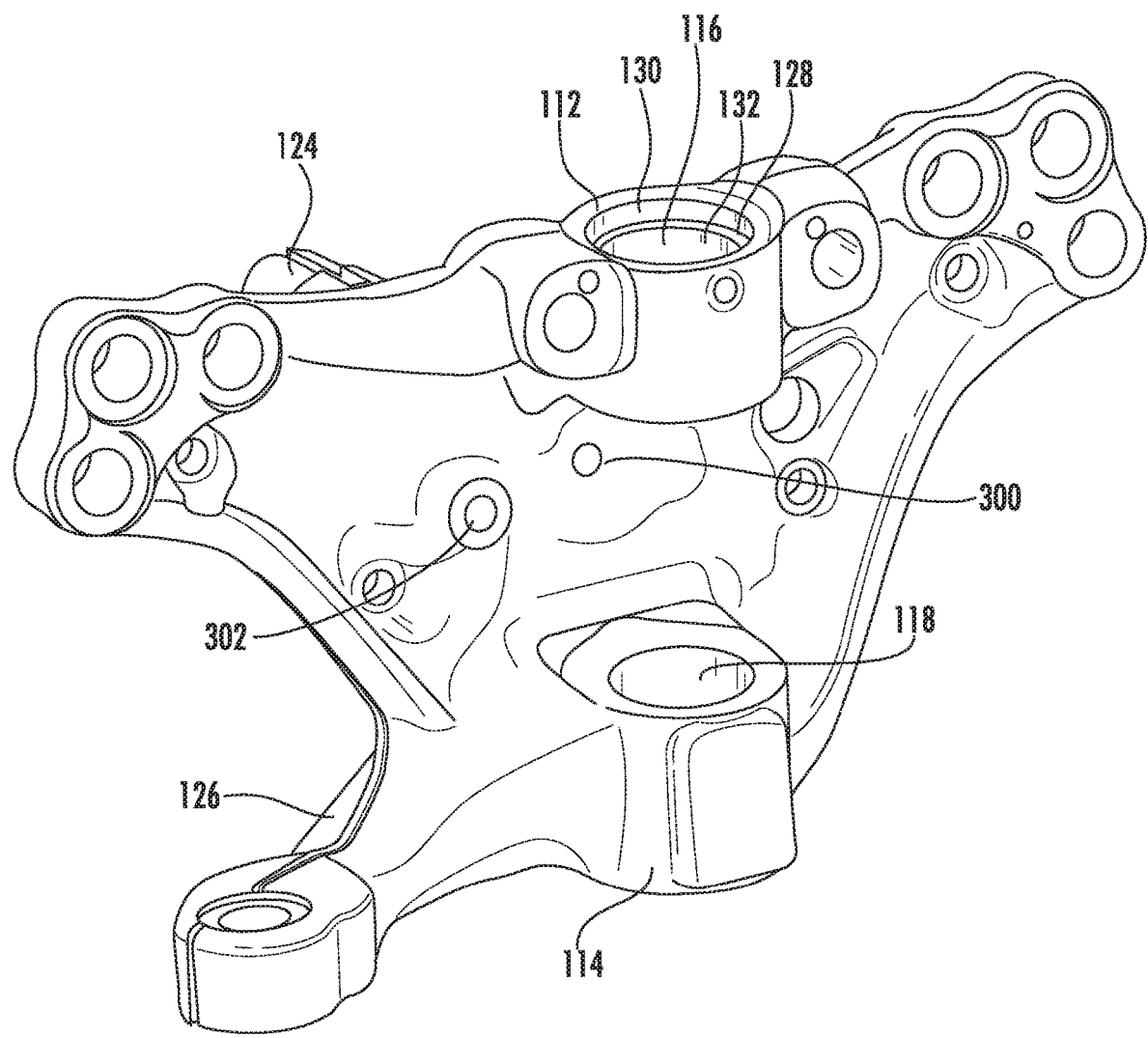
FIG. 2 illustrates another perspective view of the knuckle 110 according to FIG. 1.
Figure 3:
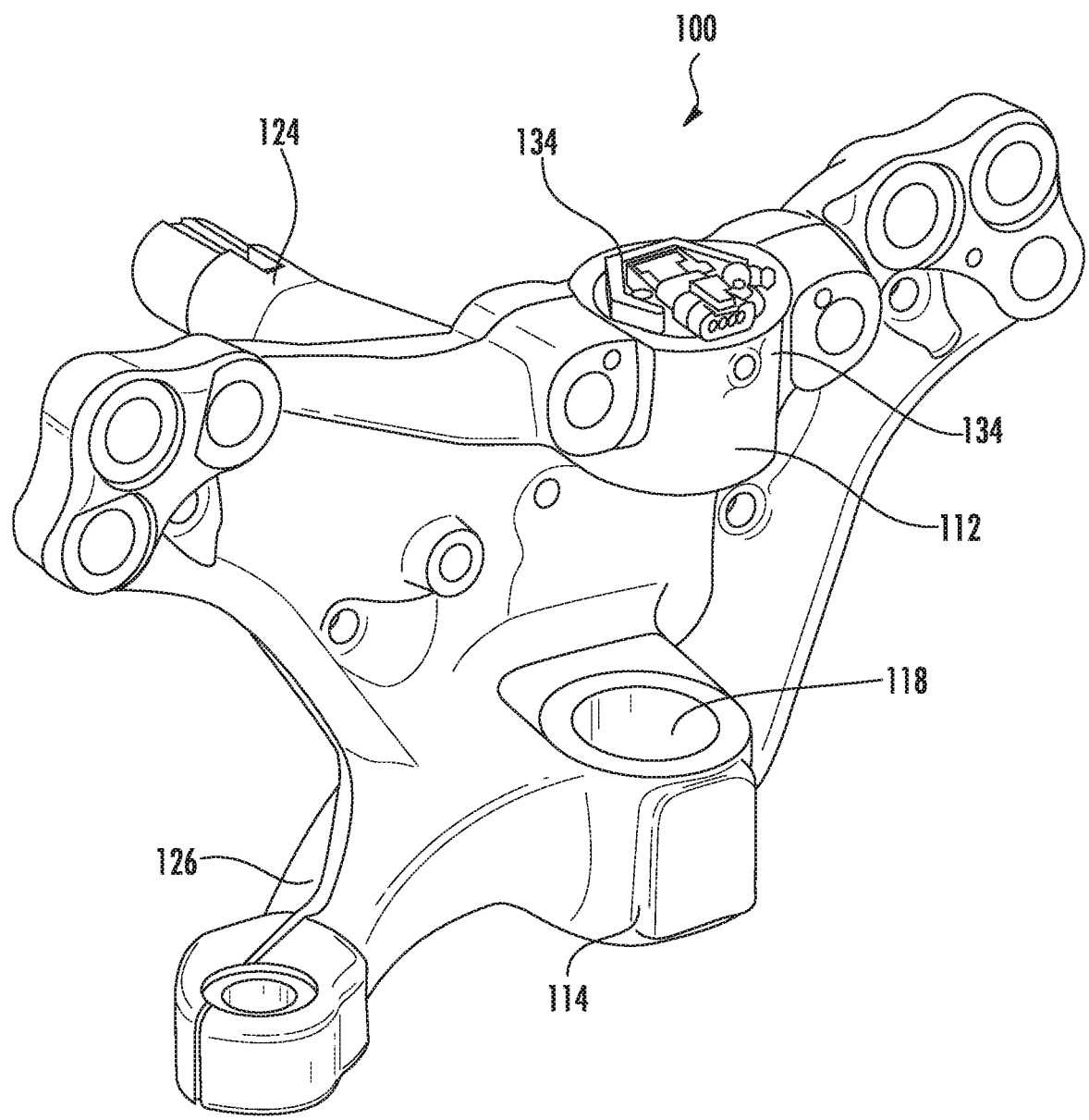
FIG. 3 illustrates a perspective view of a portion of a wheel-end assembly 100 according to FIG. 1.
Figure 10:
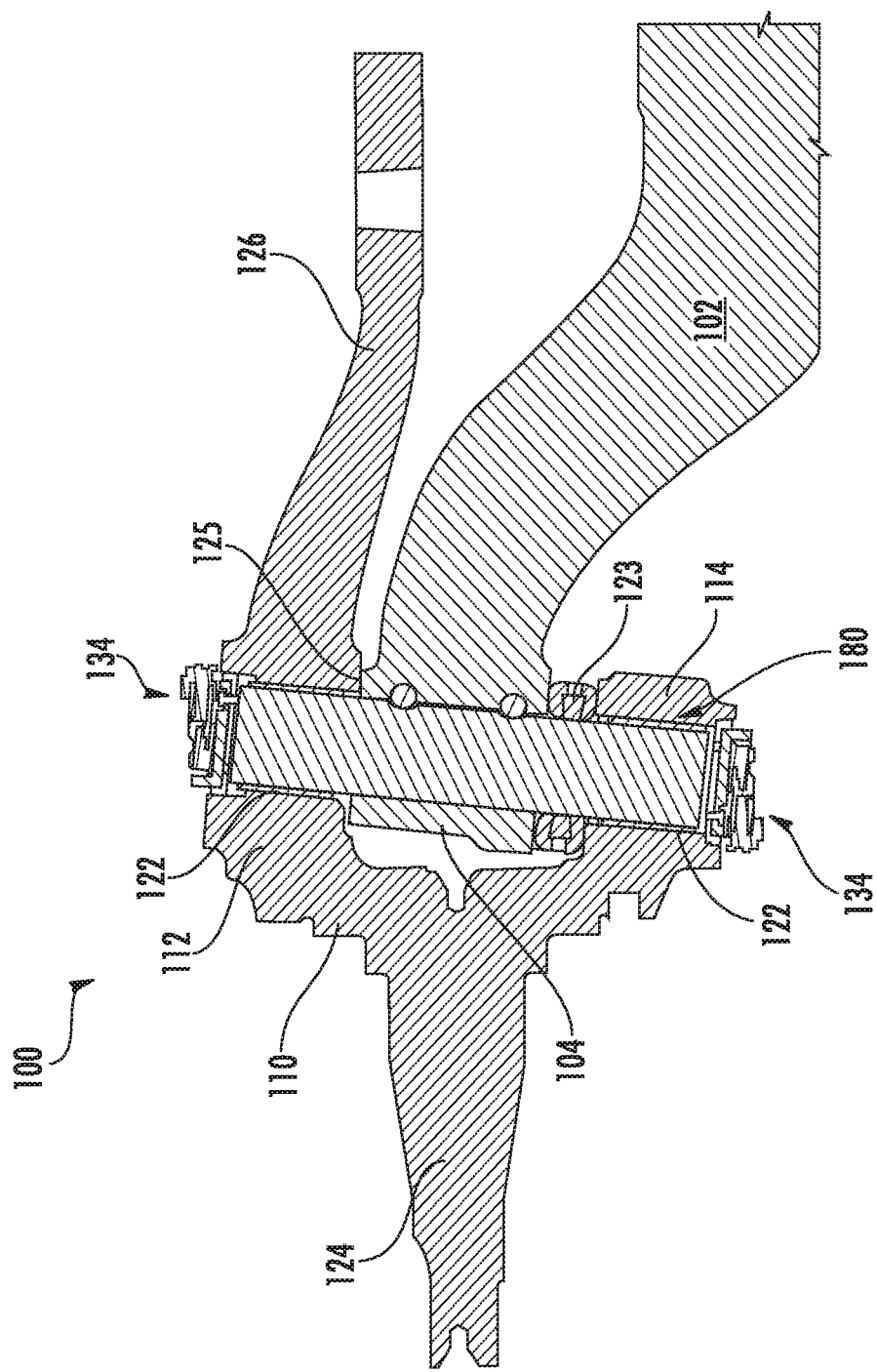
FIG. 10 illustrates a cross-sectional view of the wheel-end assembly 100.

As illustrated in FIGS. 1, 2 and 10, in an embodiment, the wheel-end assembly 100 includes a knuckle 110. The knuckle 110 may be disposed adjacent to an outboard end of a steer axle 102. In another embodiment, not depicted, the wheel-end assembly 100 may include an in-wheel motor; in such an embodiment, the knuckle 110 may be coupled with the vehicle chassis. The knuckle 110 comprises an upper kingpin boss 112 and a lower kingpin boss 114. The upper kingpin boss 112 defines an upper kingpin bore 116 extending therethrough. Similarly, the lower kingpin boss 114 defines a lower kingpin bore 118 extending therethrough. The upper and lower kingpin bores 116, 118 are generally coaxially aligned.

Figure 6:
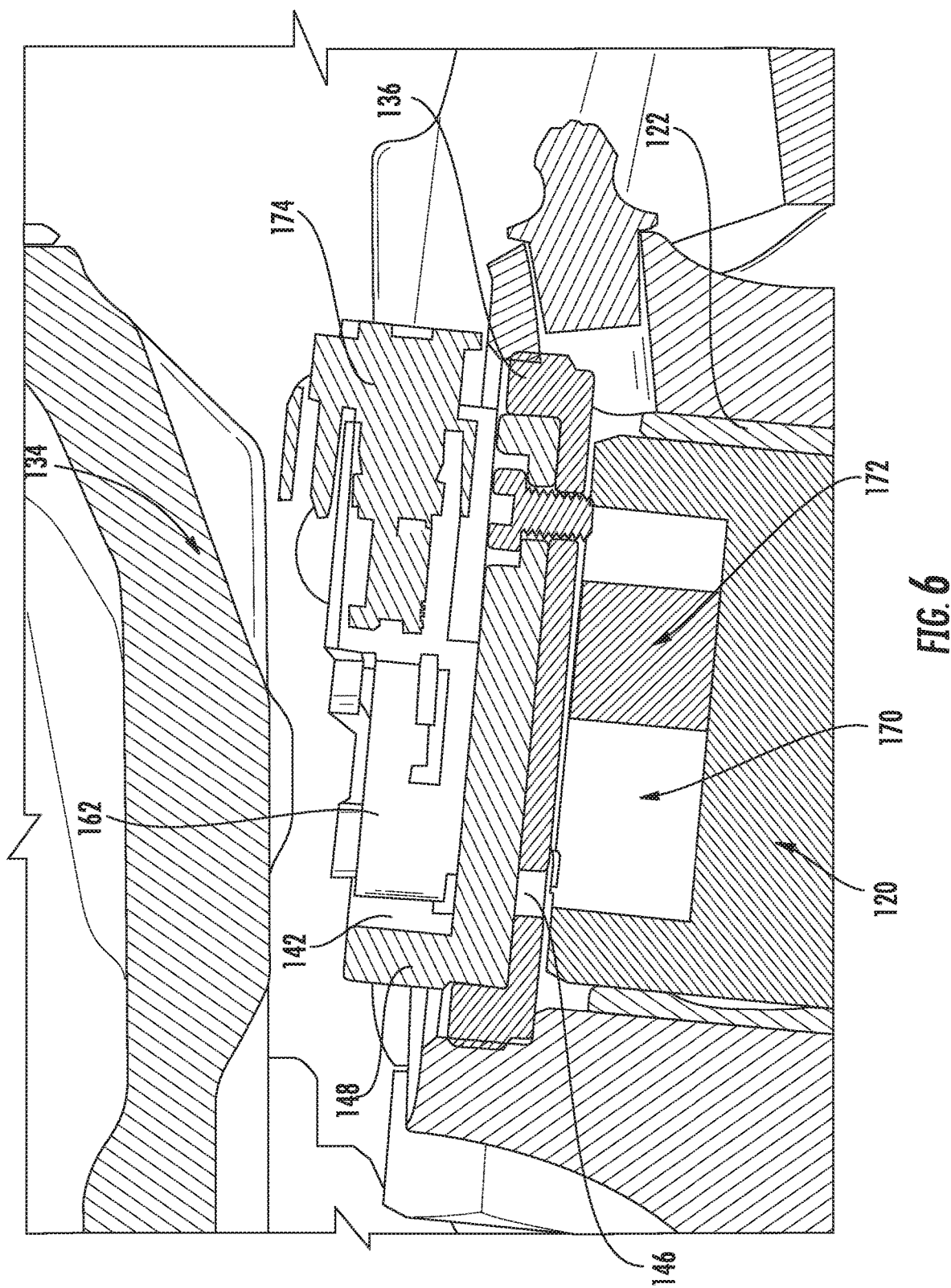
FIG. 6 illustrates a cross sectional view of a portion of the wheel-end assembly 100 according to FIG. 4.

As illustrated in FIGS. 6 and 10, the upper and lower kingpin bores 116, 118 receive a kingpin 120 rotatably disposed therein. Bushings 122 may be located within the upper and lower kingpin bores 116, 118 to pivotally support the kingpin 120. In an embodiment, the kingpin 120 is also disposed through a bore in an axle beam head 104. The kingpin 120 pivotally couples the knuckle 110 with the axle beam 102.

The knuckle 110 further comprises a spindle 124 extending therefrom in a direction generally parallel to a longitudinal axis of the steer axle when the knuckle 110 is positioned in a neutral (non-turning) state. In an embodiment, the spindle 124 may be formed unitary with the body of the knuckle 110. In another embodiment, the spindle 124 may comprise a separate component coupled with the body of the knuckle 110. As illustrated in FIG. 1, in an embodiment, an outer diameter of the spindle 124 tapers from an inboard end to an outboard end thereof. In the embodiment illustrated in FIG. 1, the spindle 124 is a non-rotating member of the wheel-end assembly 100.

A tie-rod arm 126 is also coupled with the knuckle 110. As illustrated in FIG. 1, in an embodiment, the tie-rod arm 126 is unitary with the knuckle 110 body. However, it will be apparent to those having skill in the relevant arts that the tie-rod arm 126 may also be a separable component of the wheel-end assembly 100 that may be coupled with the knuckle 110 in a conventional manner. In an embodiment, not depicted, the tie-rod arm 126 may be coupled with a second tie-rod arm which couples the knuckle 110 with a second knuckle (not depicted) disposed at an opposite end of the steer axle.

A steer arm (not depicted) or other component connection portions (not depicted) may be coupled with the knuckle 110. Additionally, one or more suspension components (not depicted) may also be coupled with the knuckle 110.

As illustrated in FIG. 2, the upper kingpin bore 116 may comprise a shoulder 128. The shoulder 128 is defined by an upper portion 130 of the kingpin bore 116 having a diameter greater than a diameter of a lower portion 132 of the kingpin bore 116. The upper portion 130 of the kingpin bore 116 may be threaded.

As illustrated in FIGS. 3-6, in an embodiment, a knuckle cap assembly 134 is coupled with the upper kingpin boss 112. The knuckle cap assembly 134 comprises a base portion 136 having a substantially discoid geometry. The base portion 136 includes an outer diameter 138. In an embodiment, at least a portion 140 of the outer diameter 138 is threaded for engaging the complimentary threads in the kingpin bore upper portion 130. A lower surface of the base portion 136 may come into contact with the kingpin bore shoulder 128.

Figure 9:
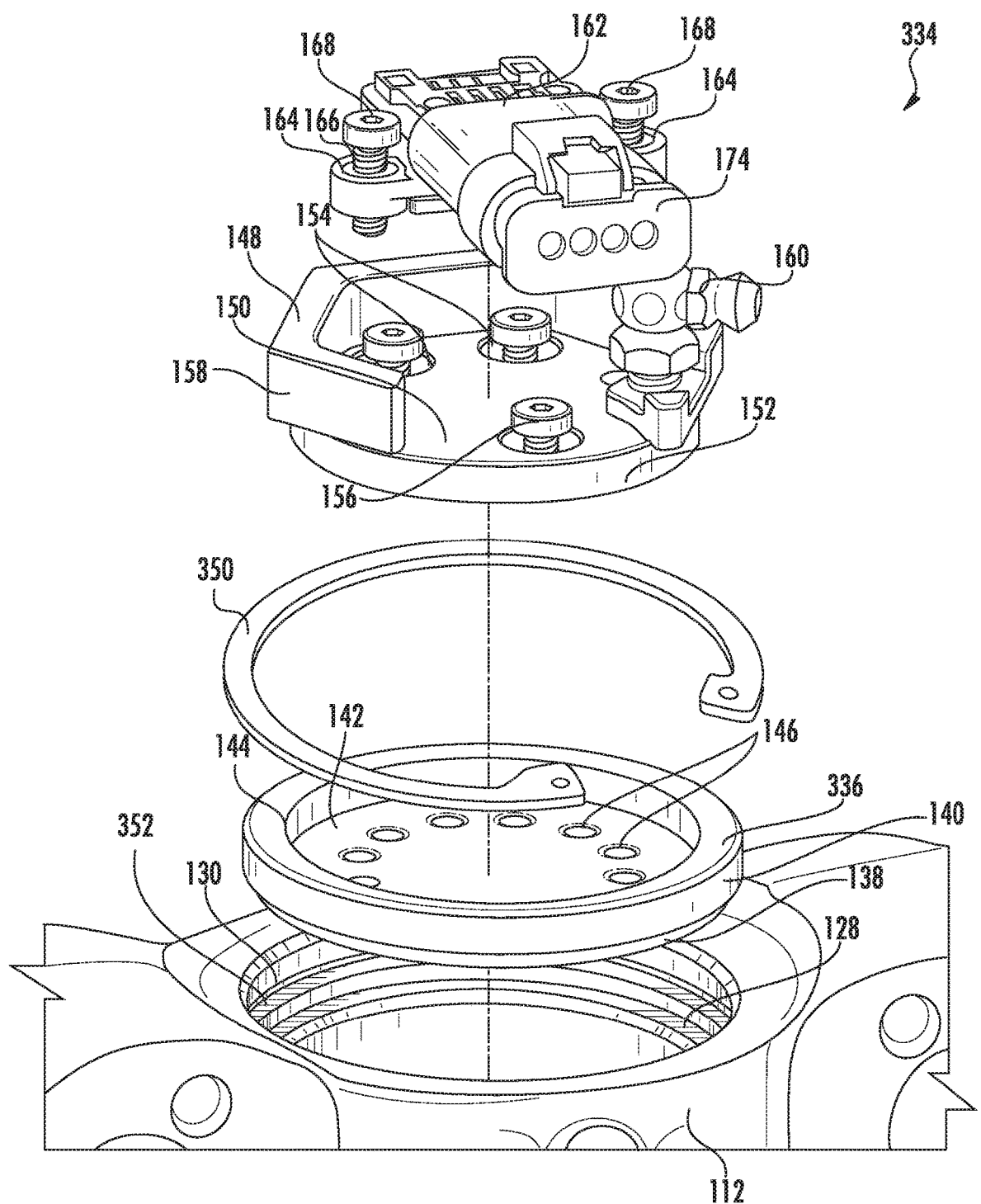
FIG. 9 illustrates an exploded view of a portion of a wheel-end assembly 100 according to another embodiment of the presently disclosed subject matter.

In another embodiment, as illustrated in FIG. 9, a knuckle cap assembly 334 may be coupled with the kingpin boss 112 via a snap ring 350. Features of the knuckle cap assembly 334 that are shared with the knuckle cap assembly 134 are indicated in FIG. 9 via like reference numbers. The snap ring 350 may be partially disposed in an annular groove 352 located in the kingpin bore upper portion 130. When the knuckle cap assembly base portion 336 is inserted in the kingpin bore upper portion 130, the snap ring 350 is inserted into the annular groove 352 such that a portion of the snap ring 352 overlaps an upper surface of the knuckle cap assembly base portion 336 and couples the knuckle cap assembly 134 with the upper kingpin boss 112.

In yet another embodiment (not depicted), the knuckle cap assembly base portion 136 may be coupled with the kingpin boss 112 via staking. When the knuckle cap assembly base portion 136 is coupled with the kingpin boss 112, a portion of the base portion 136 is radially expanded via deformation to create an interference fit between the base portion 136 and the kingpin bore upper portion 130.

In still another embodiment (not depicted), the knuckle cap assembly base portion 136 may be coupled with the kingpin boss 112 via mechanical fasteners such as bolts. In this embodiment the base portion 136 may have a greater diameter than in the embodiment depicted in FIGS. 4-6, such that a portion of the base portion 136 overlaps the upper surface of the kingpin boss 112. Bolts are inserted through fastener apertures in the base portion 136 and into fastener apertures in the knuckle 110. In an embodiment, the knuckle 110 may comprise a indentation into which the base portion 136 is at least partially inserted.

An upper portion of the base portion 136 may include a circular recess 142. The circular recess 142 has a diameter 144 with a smaller diameter than the base portion outer diameter 138. A plurality of apertures 146 may be disposed through, or at least partially through, a bottom surface of the circular recess 142 and a lower surface of the base portion 136. In the embodiment illustrated in FIGS. 3-6, the knuckle cap base portion 136 comprises a unitary component made of nonferrous material.

Figure 4:
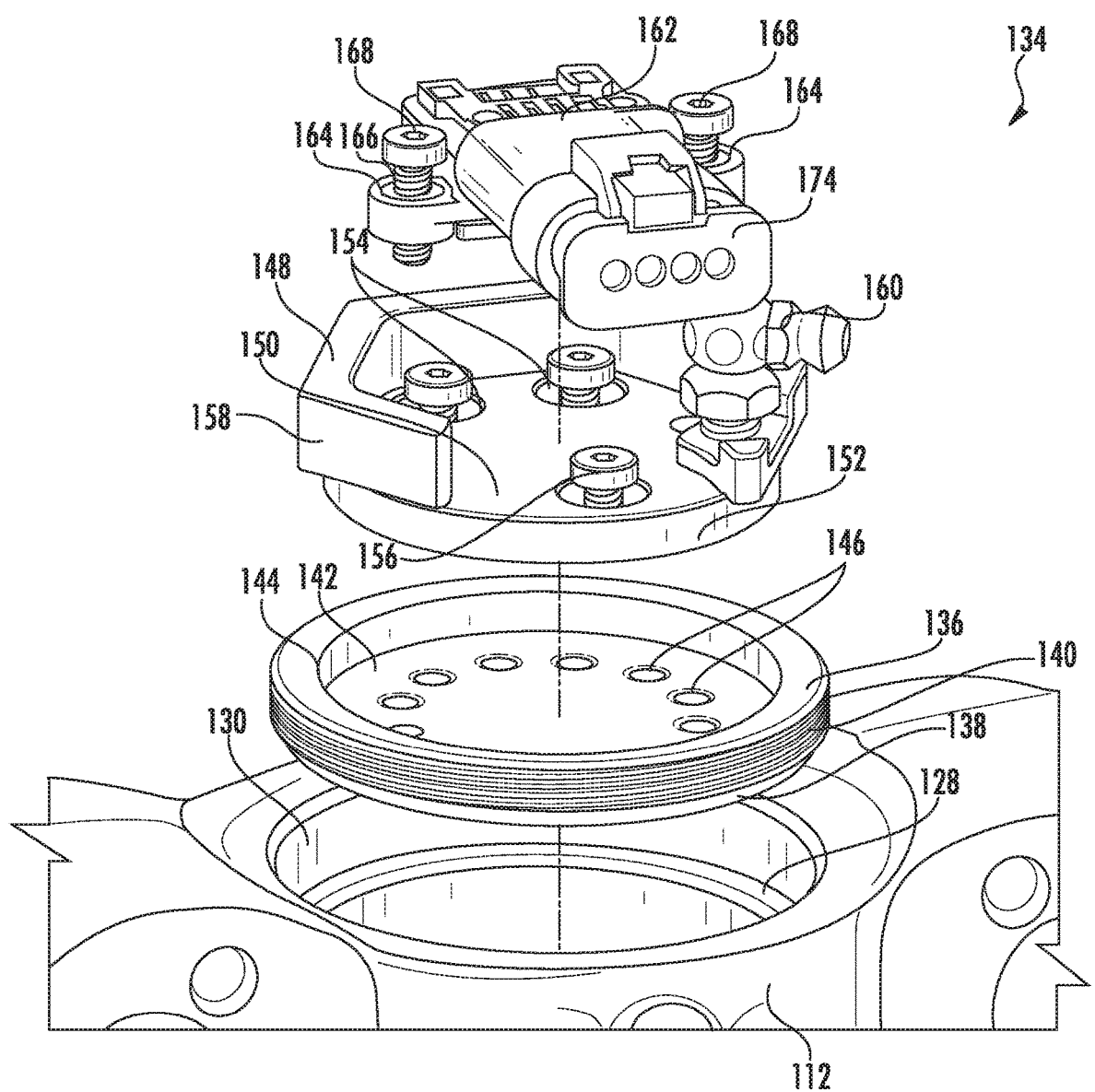
FIG. 4 illustrates an exploded view of a portion of a wheel-end assembly 100 according to an embodiment of the presently disclosed subject matter.

The knuckle cap assembly 134 further comprises a mounting portion 148 coupled with the base portion 136. In an embodiment, the mounting portion 148 includes a disc portion 150 having a diameter 152 that is smaller than the diameter 144 of the circular recess 142 in the base portion 136. A plurality of apertures 154 may be disposed through the disc portion 150. As illustrated in FIGS. 4 and 6, the mounting portion apertures 154 may be counterbored. In an embodiment, the apertures 154 may also be threaded. In another embodiment (not depicted), the circular recess 142 may comprise a different geometry, such as but not limited to, rectangular or triangular. The mounting portion disc portion 150 comprises a geometry which facilitates coupling the mounting portion 148 within the base portion recess 142.

The mounting portion 148 may further comprise a wall 158 disposed about a periphery of an upper surface of the disc portion 150. In an embodiment, the wall 158 comprises a substantially hexagonal geometry having segments 158A, 158B, 158C, 158D, and 158E (see FIG. 5). In an embodiment, the wall segment 158E defines a space through which a grease fitting 160 may be at least partially disposed. The grease fitting 160 may be coupled with the mounting portion 148 via an aperture disposed through the disc portion 150. The grease fitting 160 is in fluid communication with the kingpin bore 116. Further, the wall segments 158A and 158E may define a gap therebetween through which a sensor 162 is disposed.

At least one fastener 156 may be disposed through at least one of the mounting portion apertures 154 and the base portion apertures 146 to couple the mounting portion 148 with the base portion 136. When the base portion 136 and the mounting portion 148 are coupled, the mounting portion disc portion 150 may be at least partially disposed within the circular recess 142 of the base portion 136.

The mounting portion wall 158 enables a tool, such as a wrench, to unscrew the knuckle cap assembly 134 from the kingpin bore 116. The mounting portion 148 also enables the sensor 162 to be coupled therewith, and the mounting portion 148 rotated relative to the base portion 136 to orient the sensor 162 to a predetermined position before the mounting portion 148 is coupled with the base portion 136.

The sensor 162 may comprise one or more ears 164 having apertures 166 therethrough. In an embodiment, the apertures 166 may be threaded. Fasteners 168 disposed through the apertures 166 and two of the mounting portion apertures 154 may be utilized to couple the sensor 162 with the mounting portion 148. The knuckle cap assembly 134, with the sensor 162, is disposed adjacent to an upper end of the kingpin 120.

In an embodiment, as illustrated in FIG. 6, the upper end of the kingpin 120 comprises a recess 170 in a surface thereof. A magnet 172 is disposed in the recess 170. The magnet 172 may be disposed in a casing positioned in the kingpin recess 170. The casing may be comprised of plastic. In an embodiment, the sensor 162 is a Hall-effect sensor which measures the angular position, axial position, and radial position of the magnet 172. Integration of the magnet 172 with the kingpin 120, in conjunction with the integration of the Hall-effect sensor 162 with the knuckle cap assembly 134, enables direct measurement of the angular, axial, and radial position of each wheel-end in the steering system. In addition, utilizing the mounting portion 148 coupled with the base portion 136 via mechanical fasteners permits approximate directional alignment of the sensor 162, even when the base portion 136 is in threaded engagement with the kingpin bore portion 130.

In an embodiment (not depicted), the Hall-effect sensor 162 may be disposed on the knuckle 110 inboard of the spindle 124 at a knuckle portion 300 (see FIG. 2), and the magnet 172 may be disposed in the axle beam head 104. In this embodiment, the Hall-effect sensor 162 measures the axial and radial position of the knuckle 110 relative to the axle beam head 104.

In another embodiment (not depicted), the sensor 162 is an inductive sensor utilizing changes in a magnetic field generated thereby to determine the position of the kingpin 120. In this embodiment the inductive sensor 162 obviates the need for the magnet 172 to be integrated into the kingpin 120.

In yet another embodiment (not depicted), the sensor 162 is a resistive sensor. An output voltage of the resistive sensor 162 is determined by a change in the resistance of the resistive sensor 162. The resistance of the resistive sensor 162 is dependent upon the displacement thereof by rotation of the kingpin 120.

In still another embodiment (not depicted), the sensor 162 is an optical sensor. The optical sensor 162 scans slots (not depicted) or protrusions (not depicted) disposed in the end of the kingpin 120 adjacent to the optical sensor 162. The number of slots scanned by the optical sensor 162 indicates the angular position of the kingpin 120.

In another embodiment (not depicted), the sensor 162 may be a linear variable differential transformer ("LVDT"). An LVDT may also be utilized in conjunction with the sensor 162. In this embodiment, a first portion of the LVDT sensor 162 may be coupled with the an inboard surface of the knuckle 110, and a second portion of the LVDT sensor 162 may be coupled with the axle beam 102. The first portion of the LVDT sensor 162 may be coupled with a knuckle portion 302, as illustrated in FIG. 2. An algorithm is utilized to calculate the axial and radial position of the knuckle 110 utilizing the linear displacement of a portion of the LVDT sensor 162.

In another embodiment (not depicted), the sensor 162 may comprise a inclinometer. Because the knuckle 110 is disposed at an angle relative to the axle beam 102 coupled therewith via the kingpin 120, the inclinometer sensor 162 senses the tilt elevation of the knuckle 110. An algorithm is utilized to calculate the axial and radial position of the knuckle 110 utilizing the elevation of the knuckle 110 sensed by the inclinometer sensor 162.

Figure 5:
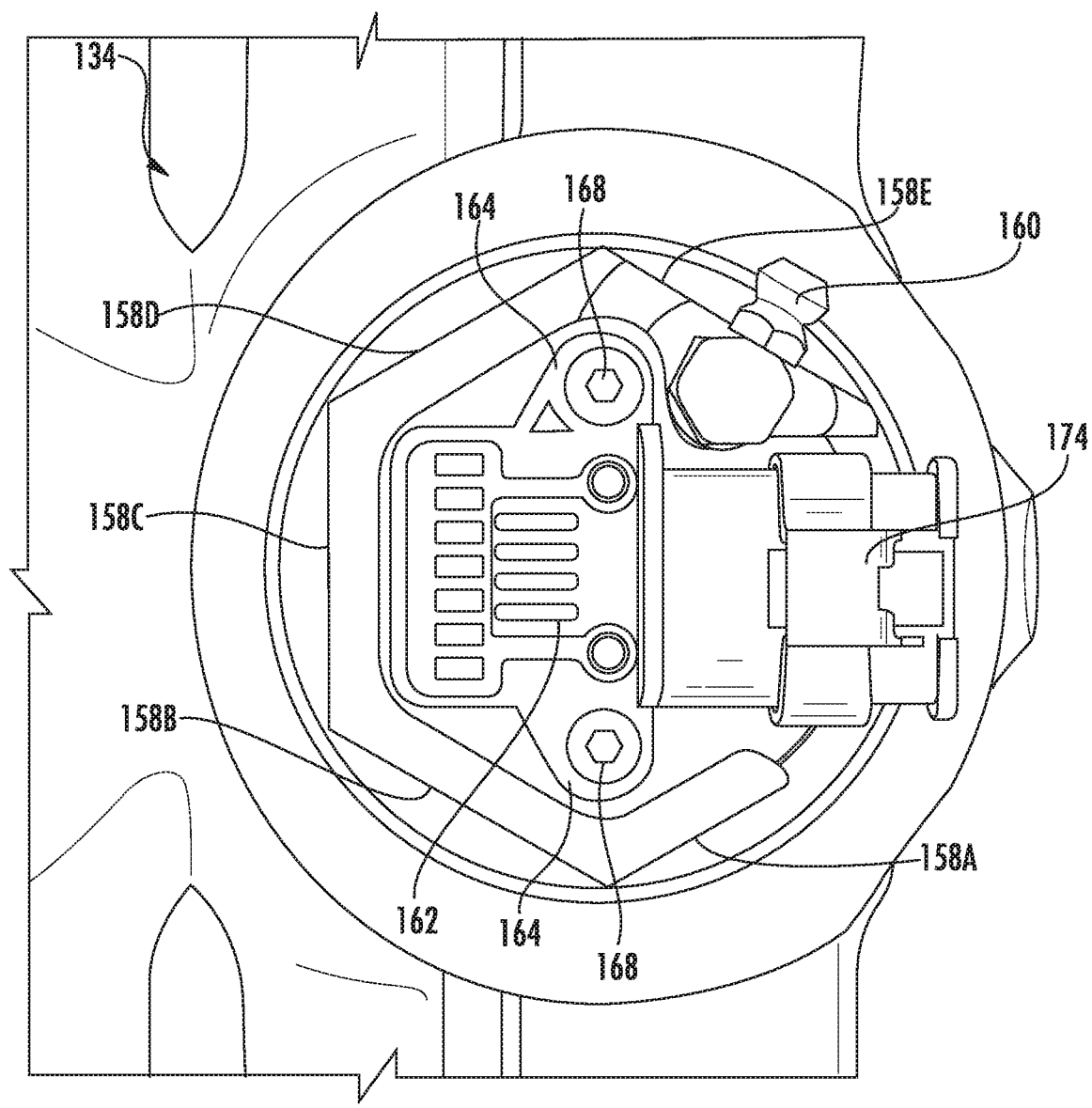
FIG. 5 illustrates another view of a portion of the wheel-end assembly 100 according to FIG. 4.

As illustrated in FIGS. 4-6, in an embodiment, a connector 174 may be utilized to electronically couple the sensor 162 with a controller (not depicted). In an embodiment, the controller may comprise a data logger. The controller may be utilized to record the sensor 162 measurements, and during maintenance of the steering system the sensor 162 measurements may be reviewed and utilized to determine and/or set, inter alia, the wheel turn angle and the toe angle. Having accurate measurement of the toe angle enables tire wear and noise vibration and harshness (NVH) to be mitigated. Accurate measurement of the turn angle at each steering wheel end via the knuckle cap assembly 134 enables the Ackermann steering geometry to be calculated accurately, and implemented without an Ackermann steering linkage. Further, the knuckle cap assembly 134 may be utilized as the primary or redundant sensor for measuring toe angle and turn angle in autonomous or semi-autonomous vehicles.

As illustrated in FIG. 10, a kingpin joint 180 may include the kingpin bosses 112, 114 having the kingpin bores 116, 118, the kingpin bushings 122, the kingpin 120, a vertical thrust bearing 123, and a shim or plurality of shims (not depicted). The kingpin bushings 122, the shims, and the vertical thrust bearing 123 commonly experience wear and degradation during conventional vehicle operation; such wear may be detected and measured by the sensor 162. In addition to measuring the relative angular position of the kingpin 120, the sensor 162 enables measurement of the linear movement of the magnet 172 in the radial and axial directions to determine the wear of the shims, axial bearing, kingpin bushings 122, and the vertical thrust bearing 123 in the kingpin joint 180.

Further, there may be four knuckle cap assemblies 134 per axle. Every kingpin 120 may have an upper and lower knuckle cap assembly 134. Utilizing more than one knuckle cap assembly 134 at each wheel end increases the accuracy the sensor 162 measurements because the controller averages the sensor 162 measurements. Further, multiple sensors 162 provide redundancy in case of a sensor 162 failure. Additionally, quantities not directly measurable by one sensor 162 may be calculated with the measurements of multiple sensors 162.

In an embodiment, the controller may be a readout device (not depicted) such as, but not limited to, a handheld readout. During vehicle maintenance, the connector 174 may couple the sensor 162 with the readout device such that the sensor 162 measurements may be reviewed.

In still another embodiment, the controller may couple the sensor 162 with an indicator light (not depicted). The indicator light may be programmed to light-up when the sensor 162 measures a predetermined value indicating misalignment in the wheel-end assembly 100. The indicator light would evidence a need to perform maintenance on the vehicle steering system. In yet another embodiment, the connector 174 may couple the sensor 162 with a CAN bus (not depicted).

In another embodiment, real time read-out of the sensor 162 measurements may be utilized in autonomous or semi-autonomous vehicles as part of a vehicle steering apparatus control system. Autonomous and semi-autonomous vehicles utilize control systems which interpret a plurality of sensory inputs to determine vehicle position and the surrounding environment. The sensor 162 measurements, such as the wheel turn angle, may provide the vehicle steering apparatus control system with information concerning the vehicle's trajectory. Further, the wheel turn angle measurements may be utilized to determine a new trajectory and/or the adjustment to the wheel turn angle necessary for a desired change in trajectory.

The signal from the sensor 162 to the controller may be an analog signal, a digital signal, or a pulse-width modulation (PWM) signal. In an embodiment utilizing an analog signal, the sensor 162 measures voltage directly. In an embodiment utilizing a digital signal, the sensor 162 measures a normalized voltage, and the sensor 162 data is communicated to the controller where a voltage value is calculated which indicates the position of the knuckle 110. In an embodiment utilizing a PWM signal, a change in the duty cycle is communicated to the controller and a position of the knuckle 110 is determined utilizing the timing of the change in the duty cycle.

Figure 7:
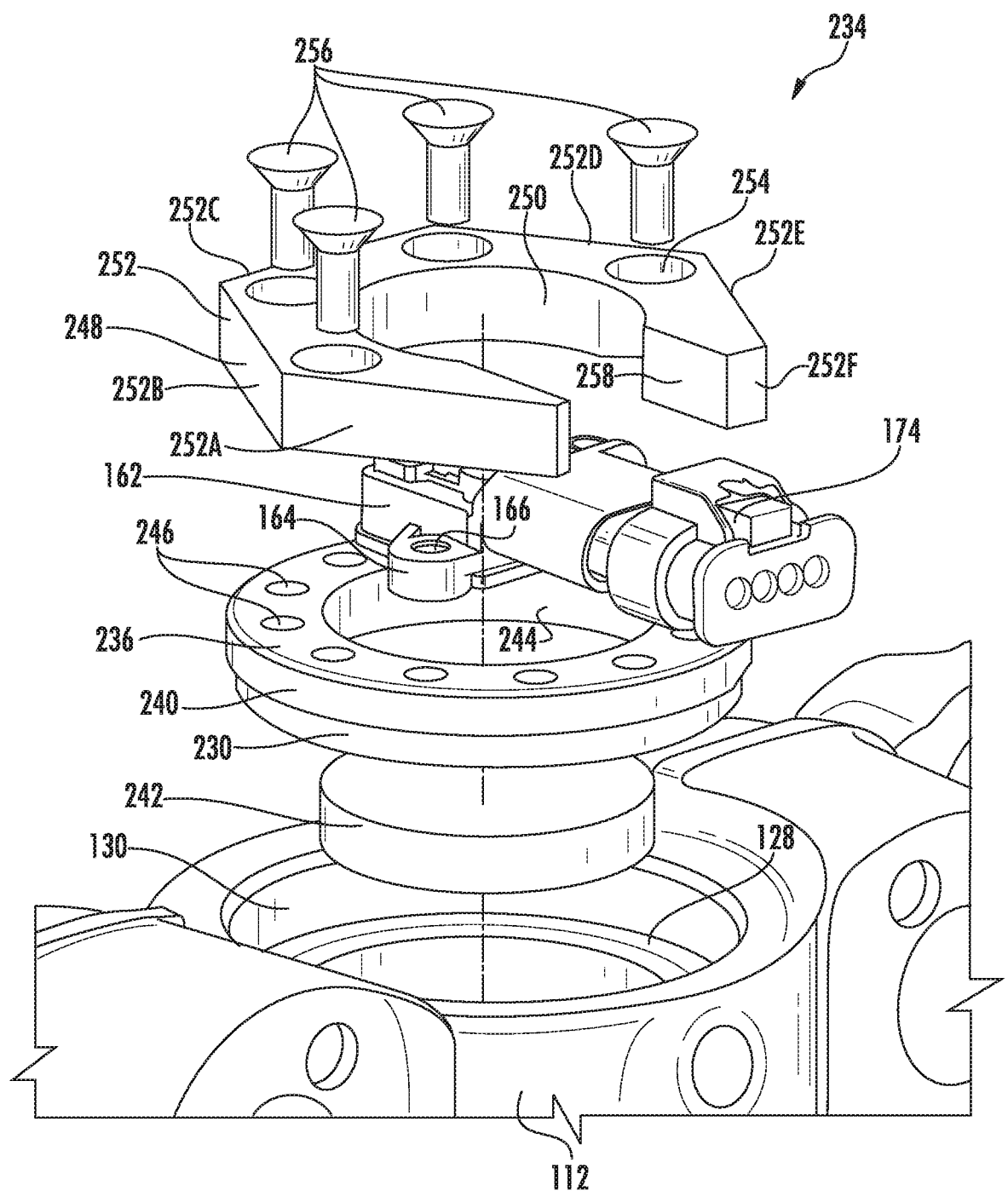
FIG. 7 illustrates an exploded view a portion of a wheel-end assembly 100 according to another embodiment of the presently disclosed subject matter.
Figure 8:
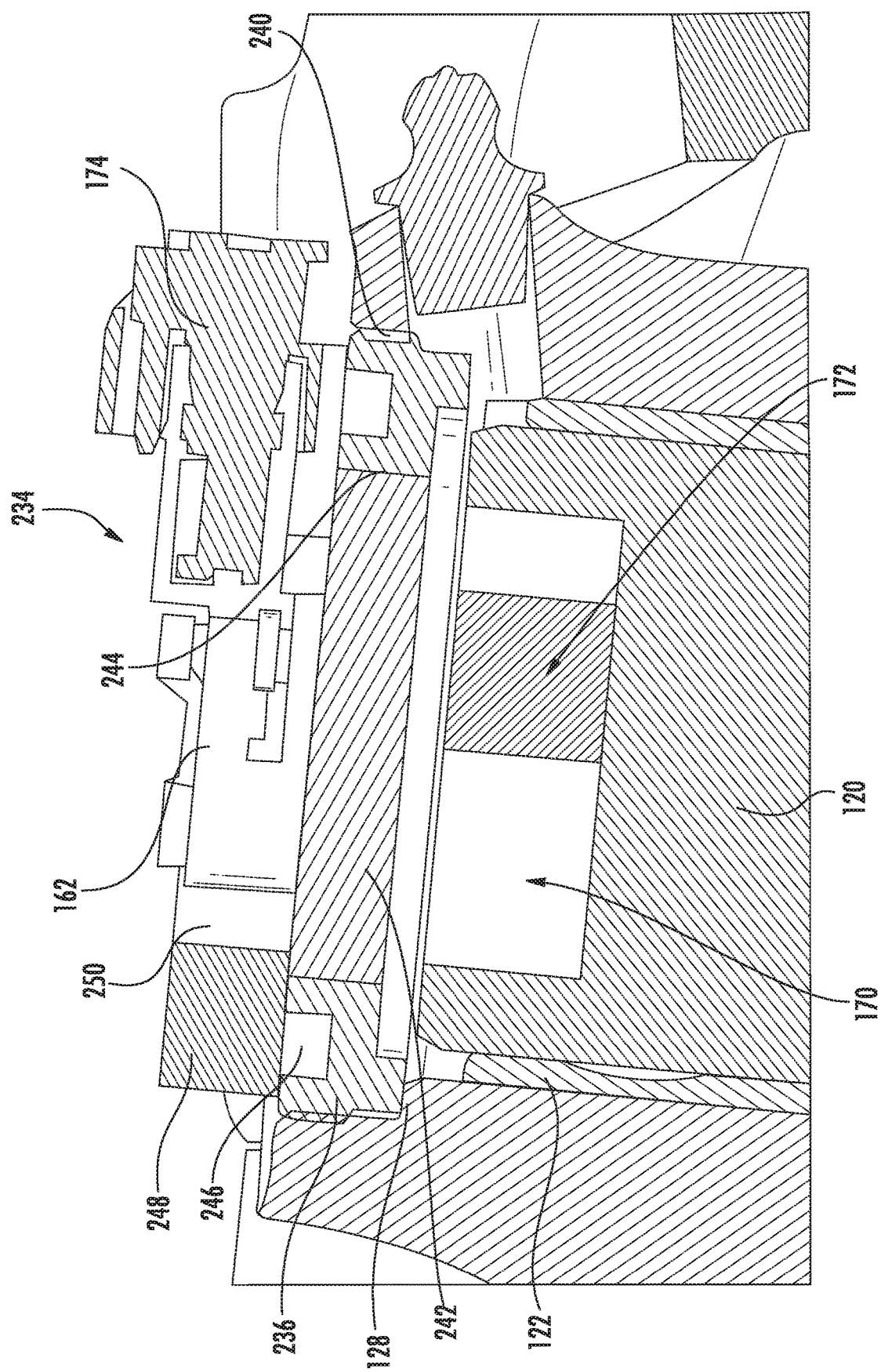
FIG. 8 illustrates a cross sectional view of a portion of the wheel-end assembly 100 according to FIG. 7.

As illustrated in FIGS. 7 and 8, in another embodiment, the wheel-end assembly 100 comprises a knuckle cap assembly 234. The knuckle cap assembly 234 includes a base portion 236 having an annular geometry. The base portion 236 includes an outer diameter 238 having a threaded portion 240 for engaging the complimentary threads of the kingpin bore upper portion 130. A lower surface of the base portion 236 may abut the kingpin bore shoulder 128. A plurality of apertures 246 are disposed at least partially through an upper surface of the base portion 236.

The base portion 236 also includes an inner diameter 244. A cap insert 242 is coupled with the base portion inner diameter 244. In an embodiment, the base portion 236 may comprise a ferrous material, and the cap insert 242 may comprise a nonferrous material. In an embodiment, the cap insert 242 may be comprised of a magnetically inert material such as aluminum. Utilizing a magnetically inert cap insert 242 allows the magnetic field of the magnet 172 (disposed in the kingpin 120) to penetrate through the base portion 236 and the cap insert 242 to the sensor 162.

As illustrated in FIGS. 7 and 8, the knuckle cap assembly 234 further comprises a mounting portion 248 removably coupled with the base portion 236. The mounting portion 248 comprises an annular geometry having an inner surface 250 and an outer surface 252. The outer surface 252 defines six surfaces 252A, 252B, 252C, 252D, 252E, 252F which delineate the hexagonal form of the mounting portion 248. As illustrated in FIG. 7, the mounting portion 248 may also define a slot 258 disposed through the surface 252F. The slot 258 accommodates the sensor 162 and/or the connector 174 when the mounting portion 248 is coupled with the base portion 236.

Additionally, a plurality of fastener apertures 254 are disposed through the mounting portion 248. In an embodiment, there are four countersunk fastener apertures 254. At least one fastener 256 is disposed through at least one of the fastener apertures 254 for threaded engagement with at least one base portion aperture 246. The fasteners 256 facilitate coupling of the mounting portion 248 with the base portion 236.

As described supra, the sensor 162 utilized with the knuckle cap assembly 234 may comprise one or more ears 164 having fastener apertures 166 therethrough. At least one fastener 256 disposed through one of the sensor ear apertures 166 and in threaded engagement with one of the mounting portion fastener apertures 254 is utilized to couple the sensor 162 with the mounting portion 248. As illustrated in FIG. 8, the knuckle cap assembly 234 is disposed adjacent to the upper end of the kingpin 120. The upper end of the kingpin 120 comprises the recess 170 in an end thereof. The magnet 172 is disposed in the recess 170. The magnet 172 may be disposed in a casing (not depicted) positioned in the kingpin 120 recess 170. In an embodiment, the casing may be comprised of plastic.

In an embodiment, real time read-out of the sensor 162 measurements may be utilized in autonomous or semi-autonomous vehicles as part of a vehicle steering apparatus control system. Autonomous and semi-autonomous vehicles utilize control systems which interpret a plurality of sensory inputs to determine vehicle position and the surrounding environment. The sensor 162 measurements, such as the wheel turn angle, may provide the vehicle steering apparatus control system with information concerning the vehicle's trajectory. Further, the wheel turn angle measurements may be utilized to determine a new trajectory and/or the adjustment to the wheel turn angle necessary for a desired change in trajectory.

Positioning the sensor 162 in the knuckle cap assembly 134 locates the sensor 162 closer to the spindle 124 than conventional turn angle sensors. Providing the sensor 162 close to the spindle 124 enables more accurate measurement of the toe angle and turn angle. Reducing the distance between the spindle 124 and the sensor 162 mitigates against noise in the sensor toe angle and turn angle measurements. In addition, conventional sensors disposed in a steering column experience a delay in turn angle measurement not experienced by the sensor 162.

While various embodiments of the presently disclosed subject matter have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A wheel-end assembly for a vehicle, comprising:
 a knuckle having a kingpin bore;
 a kingpin disposed within said kingpin bore, whereby said knuckle is at least partially rotatable about a longitudinal axis of said kingpin;
 a magnet coupled with an end of said kingpin; a knuckle cap assembly coupled with said kingpin bore adjacent to said magnet; and
 a sensor coupled with said knuckle cap assembly, wherein said sensor measures a position of said magnet relative to said sensor, and wherein said sensor is selectively positionable relative to said knuckle cap assembly.

2. The wheel-end assembly for a vehicle as recited in claim 1, said knuckle cap assembly comprising:
 a base portion; and
 a mounting portion coupled with said base portion, wherein said sensor is coupled with said mounting portion.

3. The wheel-end assembly for a vehicle as recited in claim 2, wherein:
 said kingpin bore comprises a threaded portion; and
 said base portion comprises a threaded outer surface.

4. The wheel-end assembly for a vehicle as recited in claim 2, further comprising:
 an annular groove disposed in said kingpin bore; and
 a snap ring disposed in said annular groove, wherein said snap ring abuts an upper surface of said base portion.

5. The wheel-end assembly for a vehicle as recited in claim 2, wherein
said base portion comprises a first fastener aperture;
said knuckle comprises a second fastener aperture disposed adjacent to said kingpin bore; and
a fastener is disposed through said first and second fastener apertures, whereby said base portion is coupled with said kingpin bore.

6. The wheel-end assembly for a vehicle as recited in claim 2, said base portion further comprising:
a recess disposed in an upper surface thereof; and
a plurality of fastener apertures disposed in said recess.

7. The wheel-end assembly for a vehicle as recited in claim 2, said mounting portion further comprising:
a disc portion defining a diameter smaller than the diameter of the base portion recess, wherein said disc portion includes a plurality of fastener apertures; and
a wall at least partially disposed about an upper surface of said disc portion, wherein said wall defines at least five segments angled relative to each adjacent segment.

8. The wheel-end assembly for a vehicle as recited in claim 7, wherein
said disc portion is at least partially disposed within said base portion recess;
at least one fastener is disposed through one of said disc portion plurality of fastener apertures and a fastener aperture in said base portion; and
said wall segments are hexagonally disposed.

9. The wheel-end assembly for a vehicle as recited in claim 7, wherein
a grease fitting is at least partially disposed through one of said wall segments, whereby said grease fitting is in fluid communication with said kingpin bore.

10. The wheel-end assembly for a vehicle as recited in claim 1, wherein said sensor determines the relative angular displacement between the knuckle cap assembly and the magnet.

11. A wheel-end assembly for a vehicle, comprising:
a knuckle having a kingpin bore;
a kingpin disposed within said kingpin bore, whereby said knuckle is at least partially rotatable about a longitudinal axis of said kingpin;
a knuckle cap assembly coupled with said kingpin bore, wherein said knuckle cap assembly comprises:
a base portion,
a mounting portion removably coupled with said base portion, and
a sensor coupled with said mounting portion, wherein said sensor is selectively positionable relative to the base portion.

12. The wheel-end assembly for a vehicle as recited in claim 11, wherein
said base portion defines an inner diameter and an outer diameter, and a portion of said outer diameter comprises threads; and
a nonferrous cap insert is at least partially disposed within said base portion inner diameter.

13. The wheel-end assembly for a vehicle as recited in claim 11, said mounting portion comprising:
a substantially circular inner surface;
a hexagonal outer surface; and
a slot disposed through the inner and outer surface.

14. The wheel-end assembly for a vehicle as recited in claim 11, wherein said sensor comprises an inductive sensor.

15. The wheel-end assembly for a vehicle as recited in claim 11, wherein said sensor comprises an inclinometer.

16. The wheel-end assembly for a vehicle as recited in claim 11, further comprising:
a linear variable deformation transformer having a first portion coupled with an inboard surface of said knuckle, and a second portion coupled with an axle beam.

17. A method of determining a wheel-end position, comprising:
providing a knuckle cap assembly which comprises a base portion, a mounting portion removably coupled with said base portion, a sensor in electrical communication with a controller, and a kingpin, wherein said sensor is selectively positionable relative to said base portion;
measuring an angular rotation of said sensor relative to said kingpin; and
calculating a turn angle of said wheel-end.

18. The method of determining a wheel-end position as recited in claim 17, further comprising: calculating a toe angle of said wheel-end.

19. The method of determining a wheel-end position as recited in claim 17, further comprising:
providing a shim and an axial bearing disposed about said kingpin;
calculating an axial position of said kingpin; and
determining degradation of said shim and said axial bearing.

20. The wheel-end assembly for a vehicle as recited in claim 11, further comprising:
a magnet coupled with an end of said kingpin, wherein the knuckle cap assembly is coupled with said kingpin bore adjacent to said magnet, and wherein said sensor measures a position of said magnet relative to said sensor.

* * * * *